(12) United States Patent
Faust et al.

(10) Patent No.: US 6,206,465 B1
(45) Date of Patent: Mar. 27, 2001

(54) CUSHIONING FOR A VEHICLE SEAT

(75) Inventors: Eberhard Faust; Karl Pfahler, both of Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/172,602

(22) Filed: Oct. 15, 1998

(30) Foreign Application Priority Data

Oct. 15, 1997 (DE) .............................................. 197 45 521

(51) Int. Cl.⁷ .................................................. A47C 31/00
(52) U.S. Cl. ................................. 297/180.14; 297/180.1
(58) Field of Search ........................ 297/180.14–180.13, 297/180.1, 452.42, 452.48; 5/423, 652.2, 726; 454/120, 907

(56) References Cited

U.S. PATENT DOCUMENTS

| | | | |
|---|---|---|---|
| 2,703,134 | * 3/1955 | Mossor | 297/180.14 |
| 3,137,523 | * 6/1964 | Karner | 297/180.13 |
| 3,266,064 | * 8/1966 | Figman | 5/726 |
| 4,847,933 | * 7/1989 | Bedford | 5/652.2 |
| 4,853,992 | * 8/1989 | Yu | 5/423 |
| 4,903,581 | * 2/1990 | Nilsson | 98/2.04 |
| 5,016,302 | 5/1991 | Yu . | |
| 5,102,189 | * 4/1992 | Saito et al. | 297/180.14 |
| 5,356,205 | * 10/1994 | Calvert et al. | 297/180.14 X |
| 5,645,314 | * 7/1997 | Liou | 297/180.14 |
| 5,902,014 | * 5/1999 | Dinkel et al. | 297/180.13 X |
| 5,924,766 | * 7/1999 | Esaki et al. | 297/180.13 |
| 5,927,817 | * 7/1999 | Ekman et al. | 297/180.14 X |
| 5,934,748 | * 8/1999 | Faust et al. | 297/180.13 |

FOREIGN PATENT DOCUMENTS

| | | | |
|---|---|---|---|
| 2044377 | * 3/1972 | (DE) | 297/180.1 |
| 2825597 | * 12/1978 | (DE) | 297/180.14 |
| 3903303A1 | 8/1990 | (DE) . | |
| 19628698C1 | 10/1997 | (DE) . | |
| 2572271 | * 5/1986 | (FR) | 297/180.13 |
| 2694527 | * 2/1994 | (FR) | 297/180.13 |
| 2183164 | * 6/1987 | (GB) | 5/423 |
| 2321722 | * 5/1998 | (GB) | 297/180.13 |
| 42-2176 | 9/1967 | (JP) . | |
| 0219418 | * 9/1988 | (JP) | 454/120 |
| 405023235 | * 2/1993 | (JP) | 297/180.13 |
| WO97/09908 | 3/1997 | (WO) . | |

* cited by examiner

*Primary Examiner*—Milton Nelson, Jr.
(74) *Attorney, Agent, or Firm*—Evenson, McKeown, Edwards & Lenahan, P.L.L.C.

(57) ABSTRACT

A cushioning for a vehicle seat has a cushioning layer and a ventilation layer which covers this cushioning layer and through which air flows. A plurality of air ducts completely penetrate the cushioning layer and are open on the backside of the cushioning layer and in which one miniature fan respectively is arranged for blowing air into the ventilation layer. For ventilating cushioning areas which, because of sitting aids arranged in the cushioning layer, are not suitable for a direct ventilation, the end of the air ducts assigned to these cushioning areas which faces the ventilation layer is constructed such that a portion of the air flow penetrating the air duct enters into the open cross-sectional surface of the ventilation layer.

23 Claims, 2 Drawing Sheets

CUSHIONING FOR A VEHICLE SEAT

BACKGROUND AND SUMMARY OF THE INVENTION

This application claims the priority of German application 197 45 521.2-16, filed in Germany on Oct. 15, 1997, the disclosure of which is expressly incorporated by reference herein.

The invention relates to a cushioning for a vehicle seat having a cushioning layer, a ventilation layer which covers this cushioning layer and through which air can flow, a plurality of air ducts which completely penetrate the cushioning layer and are open on the backside of the cushioning layer, and a miniature fan arranged in respective ones of the ducts for blowing air into the ventilation layer.

For ventilating vehicle seats, it has been suggested to provide in the cushioning layer of the seat cushion or of the backrest cushion a plurality of air ducts which are arranged in a uniformly distributed manner over the cushioning surfaces, on the one hand, leading out freely at the bottom side of the cushioning layer and, on the other hand, at the ventilation layer and to arrange in these air ducts in each case a miniature fan or a miniature ventilator (German Patent Document DE 196 28 698.0-16). As the result, a large air throughput is achieved in the ventilation layer which is preferably arranged as a wide-meshed spaced knit, which air throughput passes through the air-permeable pressure distribution layer of the cushioning situated above and, within a short time, cools the cushioning, which is heated, for example, during parking by sun radiation, down to a comfortable temperature. As a result of the fact that the air is taken in on the underside of the seat, thus in an area of the vehicle interior in which the lowest air temperature exists, the effectiveness of the air cooling is considerably increased Such a ventilation vertically through the cushioning is not possible in those cushioning areas in which air chambers and other aggregates are arranged in the cushioning layer, which are used, for example, for adjusting the seat contour.

It is an object of the invention to ensure, in the case of cushionings of the initially mentioned type also in those problematic cushioning areas which are situated, in particular, in the panel area of the seat cushion and the backrest of a vehicle seat, a sufficient air throughput through the cushioning area.

In the case of a cushioning for a vehicle seat of the type referred to above, this task is achieved according to the invention by providing an arrangement wherein ends of selected air ducts facing the ventilation layer are constructed such that a portion of the air flow penetrating the air duct enters into an open cross-section of the ventilation layer.

The cushioning according to the invention has the advantage that, by means of the construction according to the invention of the air ducts situated on the boundaries of the problematic cushioning area, the ventilation air is blown in diagonally from the side into the cushioning area. In this case, a large portion of the ventilation air enters vertically into the cross-sectional surface of the ventilation layer and, without flow losses, is transmitted directly in parallel to the surface. The air, which flows within the ventilation layer along the whole cushioning area, will then pass through the remaining air-permeable cushioning structure, such as the air distribution layer and the cushioning cover, and optimally carries away heat and moisture also into the problematic cushioning areas.

Advantageous embodiments of the cushioning according to the invention with expedient developments and further developments of the invention are described herein.

According to a preferred embodiment of the invention, the air duct is constructed as a cylindrical sleeve which is provided with a spout and is preferably made of plastic and is inserted in a recess in the cushioning layer. In this case, a portion of the ventilation layer over the outlet opening of the spout is introduced into the spout such that the open cross-sectional surface of the ventilation layer is acted upon by the air flow in the air duct. A web, which is constructed in a favorable manner with respect to the flow, in the area of the inlet opening of the spout, provides that the cushioning surface does not fall in the area of the spout. These constructive measures ensure an optimizing of the air inflow into the ventilation layer.

Other objects, advantages and novel features of the present invention will become apparent from the following detailed description of the invention when considered in conjunction with the accompanying drawings.

DETAILED DESCRIPTION OF THE DRAWINGS

Figure 1:
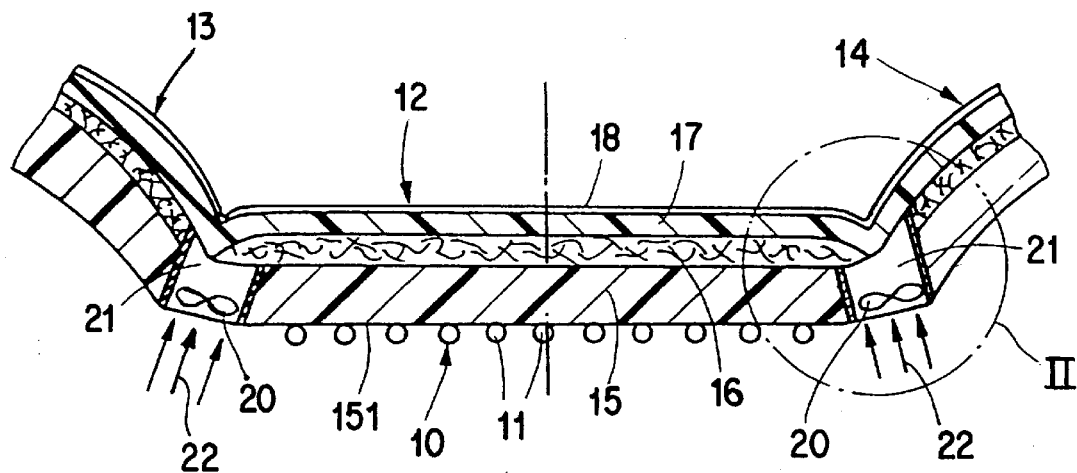
FIG. 1 is a schematic cross-sectional cutout-type view of a backrest cushioning with a backrest panel and edge elevations, constructed according to a preferred embodiment of the present application.
Figure 2:
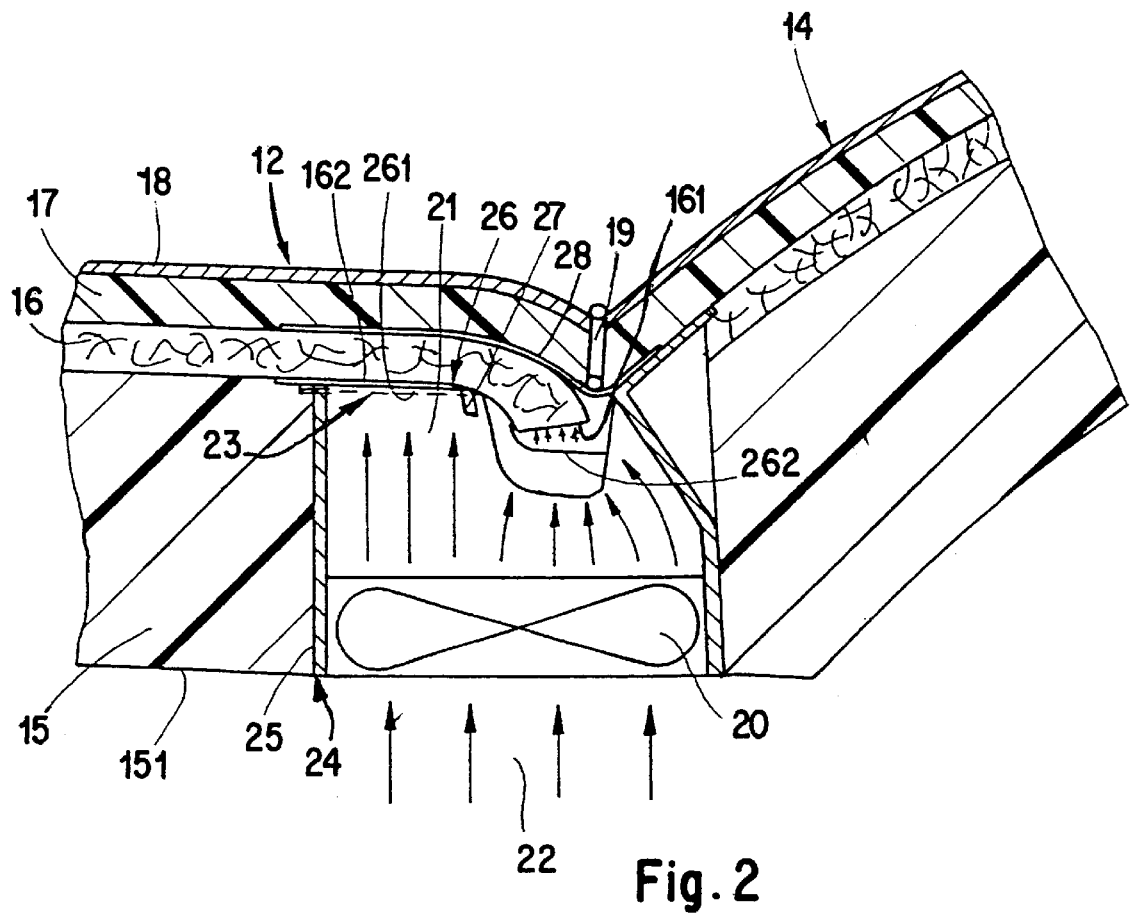
FIG. 2 is an enlarged schematic representation of the cutout II in FIG. 1.

The backrest cushioning for the backrest of a motor vehicle seat illustrated in a cross-sectional view as a cutout in FIG. 1 is fastened on a cushioning support 10 which, in the embodiment of FIG. 1, is indicated by bracing wires 11 which are fixed in a backrest frame which is not shown here. The backrest cushioning is constructed by means of a backrest panel 12 and two lateral edge elevations 13, 14. The cushioning comprises a cushioning layer 15 which rests on the cushioning support 10; a ventilation layer 16 made of a wide-meshed spaced knit which covers the cushioning layer 15 in the area of the backrest panel 12 over the whole surface and through which air can flow; an air permeable pressure distribution layer 17 which rests on the ventilation layer 16 and may consist of a spaced knit, of a nonwoven or of am open-pored foam, and an air-permeable cushioning cover 18 which spans the surface of the cushioning. In the edge elevations 13, 14, the ventilation takes place by way of separate fans not shown here. The shaping-out of the backrest panel 12 and the edge elevations 13, 14 in the cushioning takes place by so-called quilted ducts, one quilted duct 19 of which is illustrated in FIG. 2. These separate the air flow, which arrives in the panel area, from the edge elevation area.

Figure 3:
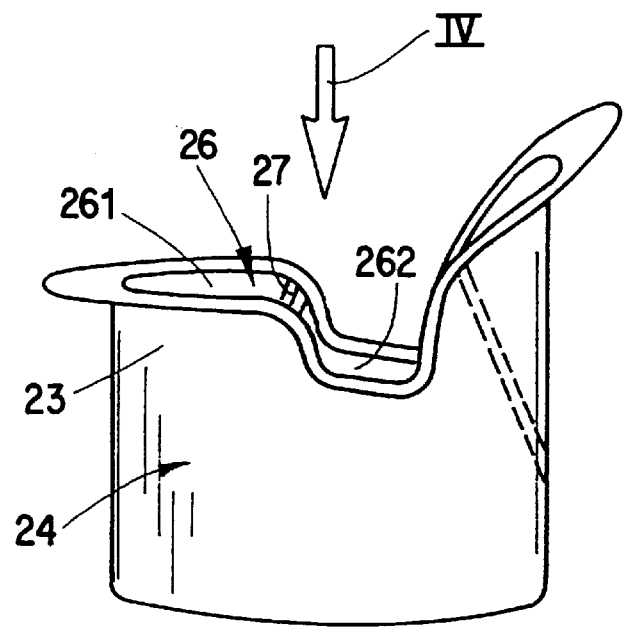
FIG. 3 is a schematic perspective representation of a sleeve which can be inserted into the cushioning for forming an air duct.
Figure 4:
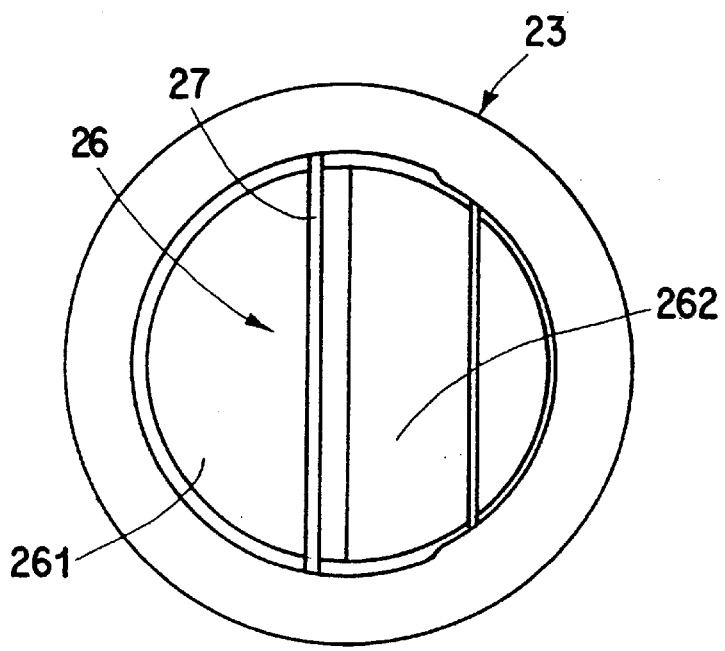
FIG. 4 is a schematic top view of the sleeve in the direction of the arrow IV in FIG. 3.

For increasing the sitting comfort, the backrest cushioning is actively ventilated in order to, for example, cool the cushioning which was heated during parking by sun radiation or for removing moisture produced by the sitting person from the cushioning cover 18. The active ventilation takes place by miniature fans 20, also called miniature ventilators which take in air from the backside of the cushioning and press it through the cushioning, the air flowing off again by way of the cushioning cover 18. For this purpose, each miniature fan 20 is inserted in an air duct 21 which completely penetrates the cushioning layer 15, reaches to the ventilation layer 16 and is open on the backside 151 of the cushioning layer 15. Since, in the area of the backrest panel 12, air chambers or other aggregates are normally arranged within the cushioning layer 15, which are used, for example, for adjusting the seat contour or for supporting the loin lordosis of the sitting person, the air ducts 21 cannot—as would be desirable for an optimal venting-through of the cushioning—be arranged in a uniformly distributed manner in the whole backrest panel 12. In order to nevertheless optimally ventilate this area, in which no direct ventilation is possible, the air ducts 21—as illustrated in FIG. 1—are arranged in the transition area from the backrest panel 12 to the edge elevations 13, 14, and the end of the air duct 21 facing the ventilation layer 16 is constructed such that a portion of the air flow flowing through the air duct 21—which air flow is illustrated by the arrows 22 in FIG. 1—enters into the open cross-sectional surface 161 of the ventilation layer 16. As indicated in the enlarged representation in FIG. 2 and in FIGS. 3 and 4, each air duct 21 is formed by a cylindrical sleeve 24 which is provided with a spout 23 and which is inserted into a recess 25 in the cushioning layer 15. The spout 23 has an outlet opening 26 which is aligned diagonally with respect to the sleeve axis and is composed of a higher-situated or farther-projecting opening section 261 and a lower-situated or set-back opening section 262. In the transition area of the two opening sections 261, 262, a web 27 is arranged which has a fluidically advantageous construction and which extends along the whole opening width of the farther-projecting opening section 261.

As illustrated in FIG. 2, in the area of the air duct 2, a portion of the ventilation layer 16 extends over the farther-projecting opening section 261 so that its underside 162 covers the farther-projecting opening section 261, and is fitted by means of its cross-sectional surface 161 into the set-back opening section 262. The web 27 prevents that the ventilation layer 16 sinks into the farther-projecting opening section 261 and thus the cushioning surface falls in. The web 27 is also used for fixing the cross-sectional surface 161 of the ventilation layer 16 in the spout 23. The air taken in by the miniature fan 20 on the backside 151 of the cushioning layer 15 flows, for the most part, directly into the open cross-sectional surface 161 of the ventilation layer 16 and is transmitted in the ventilation layer 16 without flow losses directly in parallel to the surface. A smaller portion of the taken-in air flow 22 enters at the underside 162 of the ventilation layer 16 into this ventilation layer 16, in which case this air flow encounters a significantly larger flow resistance by the ventilation layer 16. If—as illustrated in FIG. 2—above the outlet opening 26 of the spout 23, a blocking foil 28 is also inserted between the ventilation layer 16 and the pressure distribution layer 17, this portion of the air flow is deflected in the ventilation layer 16 and is also guided along in the ventilation layer 16. The blocking foil 28 simultaneously has the purpose of covering the quilted duct 19 so that air cannot escape from the air duct 21 by way of the quilted duct 19.

The invention is not limited to the above-described backrest cushioning for the backrest of a vehicle seat. The cushioning according to the invention can naturally also be used as a seat padding for the seat cushion of the vehicle seat. Problem zones also occur in the seat panel of a seat cushion in which no direct ventilation is possible because, for example, air bubbles are arranged here in the cushioning layer for adjusting the seat contour. Nevertheless, the air ducts which are arranged again at the edge of the problem area and which are constructed as described above provide an optimal active ventilating of this cushioning area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Cushioning for a vehicle seat comprising:

a backrest panel, a cushioning layer, a ventilation layer which covers over the whole surface of said cushioning layer in an area of said backrest panel and through which air can flow, a plurality of air ducts which completely penetrate the cushioning layer and terminate at the ventilation layer and are open on the backside of the cushioning layer, and a miniature fan arranged in a selected air duct of said air ducts for blowing air into the ventilation layer, wherein an end of the selected air duct facing the ventilation layer is constructed such that a portion of the air flow produced by the fan blows through the selected air duct and enters into an open cross-section of an end edge of the ventilation layer, wherein the selected air duct is formed by a cylindrical inserting sleeve which is provided with a spout and which is inserted into a recess into the cushioning layer, and wherein in an area of the selected air duct, the ventilation layer extends partially over an outlet opening of the spout and into the spout in such a manner that its open cross-sectional surface is acted upon by the air flow in the air duct.

2. Cushioning according to claim 1, wherein an outlet opening of the spout is aligned diagonally with respect to an axis of the sleeve and has a farther-projecting opening section and an opening section which is set back thereto, and wherein the ventilation layer covers the farther-projecting opening section by means of its underside, and is inserted into the opening section set back thereto by means of its cross-sectional surface.

3. Cushioning according to claim 2, wherein an area of the ventilation layer, which is situated above the outlet opening of the spout, is covered on the side of the ventilation layer facing away from the spout by means of an airtight blocking layer.

4. Cushioning according to claim 3, wherein the airtight blocking layer is a blocking foil.

5. Cushioning according to claim 2, wherein in a transition area of both opening sections, a web is arranged which extends along an opening width of the farther-projecting opening section.

6. Cushioning according to claim 5, wherein an area of the ventilation layer, which is situated above the outlet opening of the spout, is covered on the side of the ventilation layer facing away from the spout by means of an airtight blocking layer.

7. Cushioning according to claim 6, wherein the airtight blocking layer is a blocking foil.

8. Vehicle seat assembly comprising:

a first seat section, a second seat section adjoining the first seat section, a seat cushion covering said seat sections and including a cushioning layer and a ventilation layer covering the cushioning layer, an air duct disposed at a junction of said first and second seat sections, said air duct penetrates the cushioning layer and terminates at the ventilation layer and opens to a backside of the cushioning layer, and a fan arranged in said air duct and operable to blow air into the ventilation layer, wherein said air duct is configured to direct at least a portion of the air flow therethrough into an open cross section at an end edge of the ventilation layer, wherein said air duct is formed by a cylindrical inserting sleeve which is provided with a spout and which is inserted into a recess into the cushioning layer, wherein an outlet opening of the spout is aligned diagonally with respect to an axis of the sleeve and has a farther-projecting opening section and an opening section which is set back thereto, wherein the ventilation layer covers the farther-projecting opening section by means of its underside, and is inserted into the opening section set back thereto by means of its cross-sectional surface, and wherein an area of the ventilation layer, which is situated above the outlet opening of the spout, is covered on the side of the ventilation layer facing away from the spout by means of an airtight blocking layer.

9. Vehicle seat assembly comprising:

a first seat section having a backrest panel, a second seat section adjoining the first seat section, a seat cushion covering said seat sections and including a cushioning layer and a ventilation layer covering over the whole surface of the cushioning layer in an area of the backrest panel, an air duct disposed at a junction of said first and second seat sections, said air duct penetrates the cushioning layer and terminates at the ventilation layer and opens to a backside of the cushioning layer, and a fan arranged in the air duct and operable to blow air into the ventilation layer, wherein said air duct is configured to direct at least a portion of the air flow therethrough into an open cross section at an end edge of the ventilation layer, wherein said air duct is formed by a cylindrical inserting sleeve which is provided with a spout and which is inserted into a recess into the cushioning layer, and wherein in an area of said air duct, the ventilation layer extends partially over an outlet opening of the spout and into the spout in such a manner that its open cross-sectional surface is acted upon by the air flow in the air duct.

10. Vehicle seat assembly according to claim 9, wherein said air duct is configured to direct a least a portion of the air flow therethrough in a direction substantially parallel to the ventilation layer.

11. Vehicle seat assembly according to claim 9, wherein an outlet opening of the spout is aligned diagonally with respect to an axis of the sleeve and has a farther-projecting opening section and an opening section which is set back thereto, and wherein the ventilation layer covers the farther-projecting opening section by means of its underside, and is inserted into the opening section set back thereto by means of its cross-sectional surface.

12. Vehicle seat assembly according to claim 11, wherein an area of the ventilation layer, which is situated above the outlet opening of the spout, is covered on the side of the ventilation layer facing away from the spout by means of an airtight blocking layer.

13. Vehicle seat assembly according to claim 12, wherein the airtight blocking layer is a blocking foil.

14. Vehicle seat assembly according to claim 11, wherein in a transition area of both opening sections, a web is arranged which extends along an opening width of the farther-projecting opening section.

15. Vehicle seat assembly according to claim 14, wherein an area of the ventilation layer, which is situated above the outlet opening of the spout, is covered on the side of the ventilation layer facing away from the spout by means of an airtight blocking layer.

16. Vehicle seat assembly according to claim 15, wherein the airtight blocking layer is a blocking foil.

17. Cushioning for a vehicle seat comprising:

a backrest panel;

a cushioning layer;

a ventilation layer which covers over the whole surface of said cushioning layer in an area of said backrest panel and through which air can flow;

an air duct which completely penetrates the cushioning layer, terminates at the ventilation layer and is open on the backside of the cushioning layer; and a miniature fan arranged in said air duct for blowing an flow air into the ventilation layer, wherein an opening of said air duct facing the ventilation layer is constructed such that the ventilation layer extends partially over said opening and into said air duct in such a manner that a portion of the air flow produced by the fan blows through said air duct and enters into an open cross-section of an end edge of the ventilation layer.

18. The cushioning for a vehicle seat of claim 17, further comprising an air permeable pressure distribution layer which rests on the ventilation layer.

19. The cushioning for a vehicle seat of claim 17, wherein said air duct is formed by a cylindrical inserting sleeve which is provided with a spout and which is inserted into a recess into the cushioning layer.

20. The cushioning for a vehicle seat of claim 17, wherein the ventilation layer extends partially over an outlet opening of the spout and into the spout.

21. Vehicle seat assembly comprising:

a first seat section, a second seat section adjoining the first seat section, a seat cushion covering said seat sections and including a cushioning layer and a ventilation layer covering the cushioning layer, an air duct disposed at a junction of said first and second seat sections, said air duct penetrates the cushioning layer and terminates at the ventilation layer and opens to a backside of the cushioning layer, and a fan arranged in said air duct and operable to blow air into the ventilation layer, wherein said air duct is configured to direct at least a portion of the air flow therethrough into an open cross section at an end edge of the ventilation layer, wherein said air duct is formed by a cylindrical inserting sleeve which is provided with a spout and which is inserted into a recess into the cushioning layer, wherein an outlet opening of the spout is aligned diagonally with respect to an axis of the sleeve and has a farther-projecting opening section and an opening section which is set back thereto, wherein the ventilation layer covers the farther-projecting opening section by means of its underside, and is inserted into the opening section set back thereto by means of its cross-sectional surface, and wherein in a transition area of both opening sections, a web is arranged which extends along an opening width of the farther-projecting opening section.

22. Cushioning for a vehicle seat comprising:

a cushioning layer, a ventilation layer which covers this cushioning layer and through which air can flow, a plurality of air ducts which completely penetrate the cushioning layer and are open on the backside of the cushioning layer, and a miniature fan arranged in a selected air duct of said air ducts for blowing air into the ventilation layer, wherein an end, of the selected air duct facing the ventilation layer is constructed such that a portion of the air flow produced by the fan blows through the selected air duct and enters into an open cross-section of an end edge of the ventilation layer, wherein the selected air duct is formed by a cylindrical inserting sleeve which is provided with a spout and which is inserted into a recess into the cushioning layer, wherein an outlet opening of the spout is aligned diagonally with respect to an axis of the sleeve and has a farther-projecting opening section and an opening section which is set back thereto, wherein the ventilation layer covers the farther-projecting opening section by means of its underside, and is inserted into the opening section set back thereto by means of its cross-sectional surface, and wherein in a transition area of both opening sections, a web is arranged which extends along an opening width of the farther-projecting opening section.

23. Cushioning for a vehicle seat comprising:

a cushioning layer, a ventilation layer which covers this cushioning layer and through which air can flow, a plurality of air ducts which completely penetrate the cushioning layer and are open on the backside of the cushioning layer, and a miniature fan arranged in a selected air duct of said air ducts for blowing air into the ventilation layer, wherein an end of the selected air duct facing the ventilation layer is constructed such that a portion of the air flow produced by the fan blows through the selected air duct and enters into an open cross-section of an end edge of the ventilation layer, wherein the selected air duct is formed by a cylindrical inserting sleeve which is provided with a spout and which is inserted into a recess into the cushioning layer, wherein an outlet opening of the spout is aligned diagonally with respect to an axis of the sleeve and has a farther-projecting opening section and an opening section which is set back thereto, wherein the ventilation layer covers the farther-projecting opening section by means of its underside, and is inserted into the opening section set back thereto by means of its cross-sectional surface, and wherein an area of the ventilation layer, which is situated above the outlet opening of the spout, is covered on the side of the ventilation layer facing away from the spout by means of an airtight blocking layer.

* * * * *